United States Patent [19]

Minnick et al.

[11] Patent Number: 5,247,636
[45] Date of Patent: Sep. 21, 1993

[54] DIGITAL PROCESSOR CLOCK CIRCUIT

[75] Inventors: Jeffrey A. Minnick; Warren J. Spina, both of Lexington, Ky.

[73] Assignee: International Business Machines Corporation, Armonk, N.Y.

[21] Appl. No.: 531,500

[22] Filed: May 31, 1990

[51] Int. Cl.⁵ .......................................... G06F 13/00
[52] U.S. Cl. .............................. 395/425; 395/550;
364/DIG. 1; 364/243.4; 364/251.4; 364/260;
364/260.1; 364/260.2; 364/270.2; 364/270.9;
364/271.5
[58] Field of Search ............... 364/200, 900, DIG. 1,
364/DIG. 2; 395/425, 725, 550, 325, 250

[56] References Cited

U.S. PATENT DOCUMENTS

| | | | |
|---|---|---|---|
| 3,941,989 | 3/1976 | McLaughlin et al. | 395/750 |
| 3,984,812 | 10/1976 | Dahlberg et al. | 340/172.5 |
| 4,095,265 | 6/1978 | Vrba | 395/425 |
| 4,153,941 | 5/1979 | Caddell | 395/550 |
| 4,191,998 | 3/1980 | Carmody | 395/550 |
| 4,217,637 | 8/1980 | Faulkner et al. | 395/550 |
| 4,282,572 | 8/1981 | Moore, III et al. | 395/425 |
| 4,435,757 | 3/1984 | Pross, Jr. | 395/550 |
| 4,486,833 | 12/1984 | Daudelin | 395/275 |
| 4,507,732 | 3/1985 | Catiller et al. | 395/275 |
| 4,523,274 | 6/1985 | Fukunaga et al. | 395/325 |
| 4,546,269 | 10/1985 | Johnson | 307/269 |
| 4,631,659 | 12/1986 | Hayn, II et al. | 395/325 |
| 4,636,656 | 1/1987 | Snowden et al. | 307/267 |
| 4,727,491 | 2/1988 | Culley | 395/500 |
| 4,794,523 | 12/1988 | Adan et al. | 395/250 |
| 4,835,681 | 5/1989 | Culley | 395/500 |
| 4,839,796 | 6/1989 | Rorden et al. | 395/425 |
| 4,918,586 | 4/1990 | Niimura et al. | 395/425 |
| 4,972,518 | 11/1990 | Matsuo | 307/480 |
| 4,981,296 | 1/1991 | Shiraishi et al. | 395/550 |
| 5,018,168 | 5/1991 | Matsuoka | 375/106 |
| 5,034,917 | 7/1991 | Bland et al. | 395/425 |
| 5,043,943 | 8/1991 | Crisp et al. | 371/51.1 |

FOREIGN PATENT DOCUMENTS 0238090 3/1987 European Pat. Off. .

OTHER PUBLICATIONS

Patent Abstracts of Japan, vol. 13, No. 149 (P-855) (3497) 12 Apr. 1989 & JP-A-63 311 533 (Mitsubishi Electric Corp.) 20 Dec. 1989 *abstract*.
Patent Abstracts of Japan, vol. 8, No. 1 (P-246) (1438) 6 Jan. 1984 & JP-A58 165 125 (Hitachi Seisakusho K. K.) 30 Sep. 1983 *abstract*.
Electronic Design. vol. 31, No. 17, 18 Aug. 1983, Waseca, MN, Denville, NJ, USA, pp. 228-230; Sundararajan et al.: "Multiple-wait-state generator handles slow peripherals" *the whole document*.
IBM Technical Disclosure Bulletin, vol. 23, No. 3, Aug. 1980, New York, U.S., p. 984; Buonomo et al.: "microprocessor bus cycle stretcher" *the whole document*.
Patent Abstracts of Japan, vol. 7, No. 75 (P-187) (1220) 29 Mar. 1983 & JA-A58 004 468 (Sharp K. K.) 11 Jan. 1983 *abstract*.
Patent Abstracts of Japan, vol. 12, No. 43 (P-664) (2890) 9 Feb. 1988 & JP-A-62 191 961 (Seiko Epson Corp.) 22 Aug. 1987 *abstract*.
IBM Tech. Disclosure Bulletin, vol. 31, No. 12, May 1989, p. 116, "Variable Duration Microprocessor Clock Generation".

*Primary Examiner*—Michael R. Fleming
*Assistant Examiner*—Ayaz R. Sheikh
*Attorney, Agent, or Firm*—J. J. McArdle; W. H. Steinberg

[57] ABSTRACT

A clock circuit (12) normally couples clock pulses to a microprocessor (11), which is capable of accessing memory devices (13,14) having different access times. Access of a "slow" memory device 14 is detected by the clock circuit, and in response thereto, one or more clock pulses are not coupled to the microprocessor. This suspends operation of the microprocessor for a suitable amount of time so that the microprocessor reads valid data from the slow memory device. The number of clock pulses blocked from reaching the microprocessor can be set in a delay circuit (28) in the clock circuit.

3 Claims, 4 Drawing Sheets

DIGITAL PROCESSOR CLOCK CIRCUIT

FIELD OF THE INVENTION

This invention relates generally to digital processors operating in response to clock pulses and more particularly concerns such processors which access memory devices of various types.

BACKGROUND OF THE INVENTION

Digital processors access (read from and write to) external memory in a particular time interval based upon the length of the processor cycle required to perform the access. In the case of a microprocessor performing a memory read operation, for example, five states (or clock cycles) of the microprocessor might be required to access the memory.

In such a case, one or more of the states is required to allow the memory device time to place the requested data on the data lines to the microprocessor. If this time is more than the time for one state (clock cycle time), the memory requires more than one state to accomplish this function.

Depending upon the microprocessor clock frequency and the access time of the memory device involved in the memory "read" operation, a greater or lesser number of states is required to access the memory. Ideally, for a given microprocessor clock speed, the memory which is to be accessed by the microprocessor will have been selected to permit memory access in a minimum number of states of the microprocessor.

Often, the microprocessor is required to interface with memory, or other peripheral devices, having access times of different durations. Once the number of microprocessor cycles for a memory access is selected, the maximum access time possible for a memory device is substantially established by the microprocessor clock rate. If slower-access-time memory devices are interfaced with the microprocessor, and if no other adjustments are made, the clock frequency must be slowed to accommodate the slowest attached device.

An alternative, to maintain the microprocessor clock speed, is to introduce additional wait states within the memory access cycle of the microprocessor for slow devices. During these wait states, the microprocessor waits for the memory device to complete its operation. To do this, normally a signal line is coupled from the memory device or its associated controller to the microprocessor; and the microprocessor adds inactive wait cycles until it receives a signal that the data requested from the memory device is available to be read.

In a situation where, for example, two peripheral devices having different access times are interfaced to a microprocessor, it may be desired to maintain a fast clock speed, compatible with the faster (shorter access time) device and yet not introduce wait states into the microprocessor access cycle when accessing the slower device. In some cases, the microprocessor might be incapable of adding wait states during a device access cycle.

This invention permits the use of a digital processor with peripheral devices having variable access times without slowing the basic clock frequency of the microprocessor or introducing microprocessor wait states.

SUMMARY OF THE INVENTION

In carrying out the invention, a microprocessor clock circuit is provided which normally couples high frequency clock pulses to the microprocessor and which is operable to block a set number of the clock pulses from the microprocessor upon the receipt of a signal indicating that the microprocessor is accessing a slower peripheral device.

As used herein, a "slow" peripheral device or memory device means one which has an access time longer than that provided during the normal access cycle of the microprocessor for that device. A "fast" peripheral device or memory device means one which has an access time equal to or shorter than the access time provided by the operation of the microprocessor at the normal clock rate.

In one form of the invention, the number of clock pulses which are not coupled to the microprocessor during the access of a slow peripheral device is settable, so that the clock circuit can accommodate a change, for example, of the peripheral device.

Further advantages of the invention will become apparent upon reading the following detailed description and upon reference to the drawings, in which:

Figure 1:
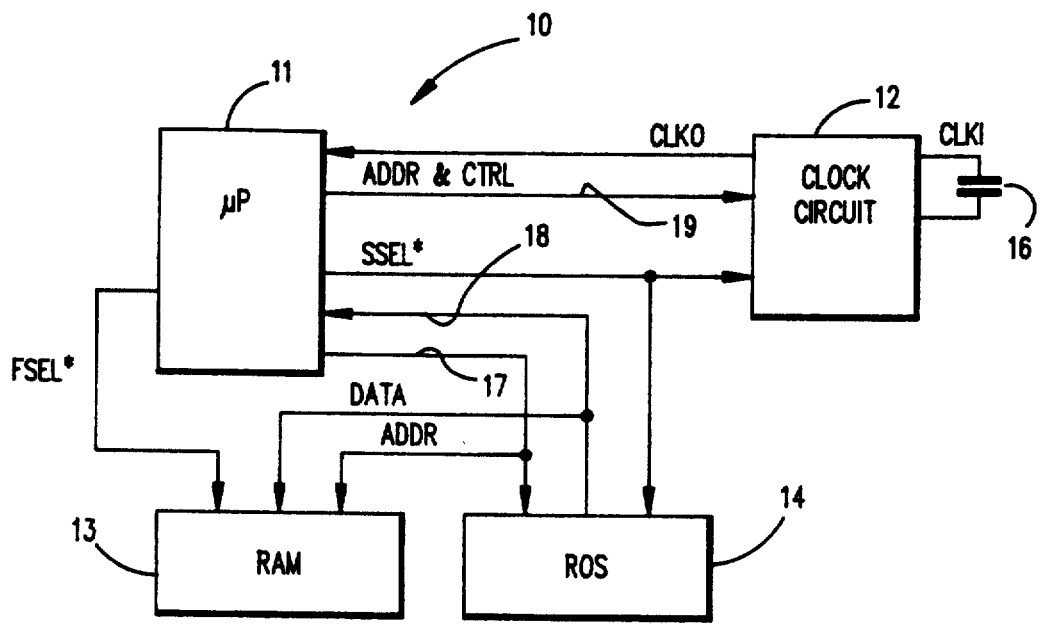
FIG. 1 is a block diagram of a microprocessor system including a clock circuit in accordance with the present invention.

While the invention is susceptible to various modifications, certain illustrative embodiments have been shown by way of example in the drawings and will herein be described in detail. It should be understood that it is not intended to limit the invention to the particular forms disclosed, but the intention is to cover all modifications, equivalents and alternatives falling within the spirit and scope of the invention as defined by the appended claims.

With initial reference to FIG. 1, a microprocessor system 10 includes a microprocessor 11 receiving clock pulses from a clock circuit 12 and accessing random access memory (RAM) 13 and read only storage (ROS) 14.

A source 16 of high frequency clock pulses supplies these pulses (CLKI) to the clock circuit 12, which in turn outputs a clock pulse signal CLKO which is provided to the microprocessor 11.

When the microprocessor 11 accesses the RAM 13, it produces a "fast select" signal FSEL*, and when the microprocessor accesses the ROS 14, it produces a "slow select" signal SSEL*. These "select" signals may in practice be comprised of signals on memory address lines.

Address information is placed by the microprocessor on the bus 17, and data is placed on the bus 18, when the RAM 13 is to be accessed for a read or write operation, or when the ROS 14 is to be read. When the RAM 13 is accessed by the microprocessor 11, with the production of the FSEL* signal, the input clock pulses CLKI are coupled through the clock circuit 12 to form the clock output pulses CLKO to the microprocessor 11. An additional address and control bus 19 is coupled from the microprocessor 11 to the clock circuit 12.

In accordance with the invention, when the slower access time ROS 14 is read by the microprocessor 11, with the production of the slow select signal SSEL*, the clock circuit 12 introduces a delay between the clock pulses in the CLKO signal.

Figure 2:
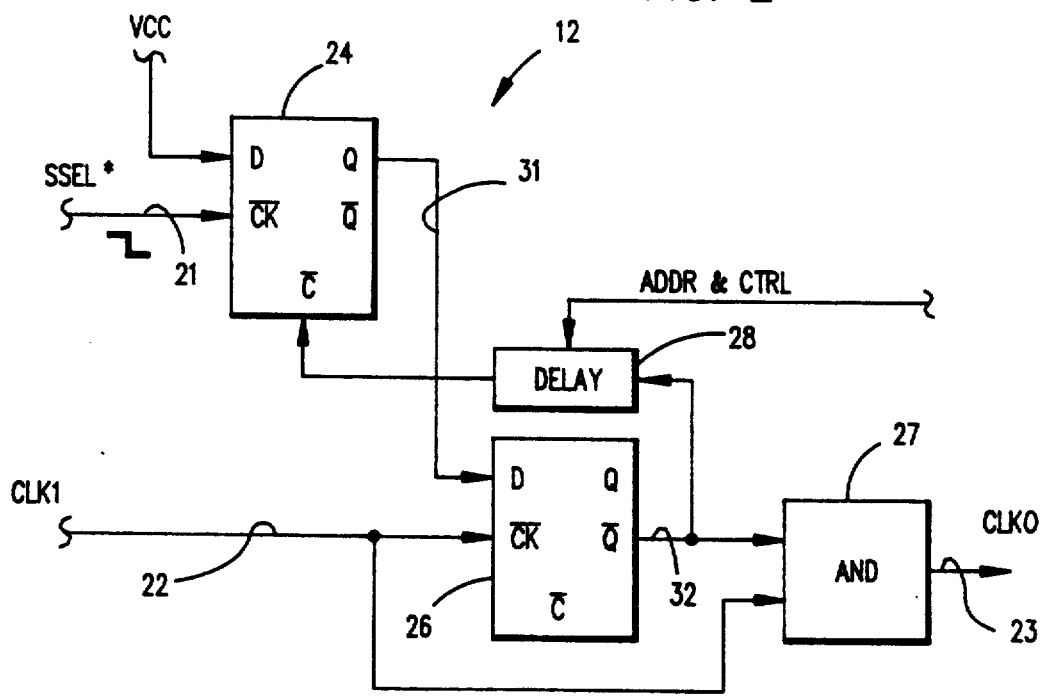
FIG. 2 is a simplified schematic diagram of the clock circuit of FIG. 1.

A simplified form of the clock circuit 12 is shown in FIG. 2. The clock circuit 12 receives the slow select signal SSEL* on a line 21 and the clock input signal CLKI on a line 22, to produce the clock output signal CLKO on a line 23. The circuit 12 includes flip-flops 24,26, an AND gate 27, and a delay circuit 28. In the absence of a slow select signal (a logic low) on the line 21, the input clock pulses on the line 22 are simply coupled to the clock output line 23. The input clock pulses form one input to the AND gate 27, and the other input is maintained at a logic high by flip-flop 26 in the absence of the slow select signal.

Figure 3:
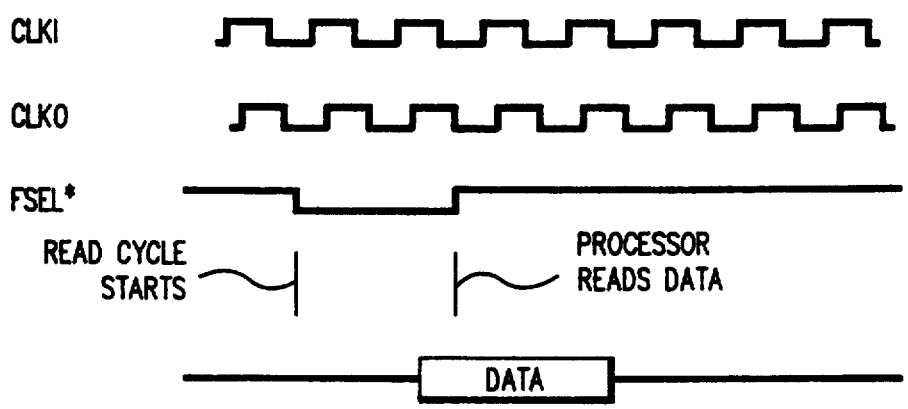
FIG. 3 shows clock signal waveforms for the microprocessor of FIG. 1 when "fast" memory is accessed.

As shown in FIG. 3, the output clock pulses in this situation occur at the same rate as the input clock pulses, slightly delayed due to the logic circuitry delays in the circuit 12. When a fast select signal is produced for, for example, reading the RAM 13, the microprocessor 11, on subsequent falling edges of the output clock pulses, places address information on the bus 17 and then reads the data. The "data read" operation occurs on the rising edge of the fast select signal, which occurs at a time after the data is available and stabilized on the data bus 18. As illustrated in FIG. 3, there are two falling edges of output clock cycles after the start of the read cycle before the processor reads the data. The number of cycles in this interval may be greater, for example four cycles, depending upon the number of clock cycles needed to address the memory device and for the data to settle on the data line.

Figure 4:
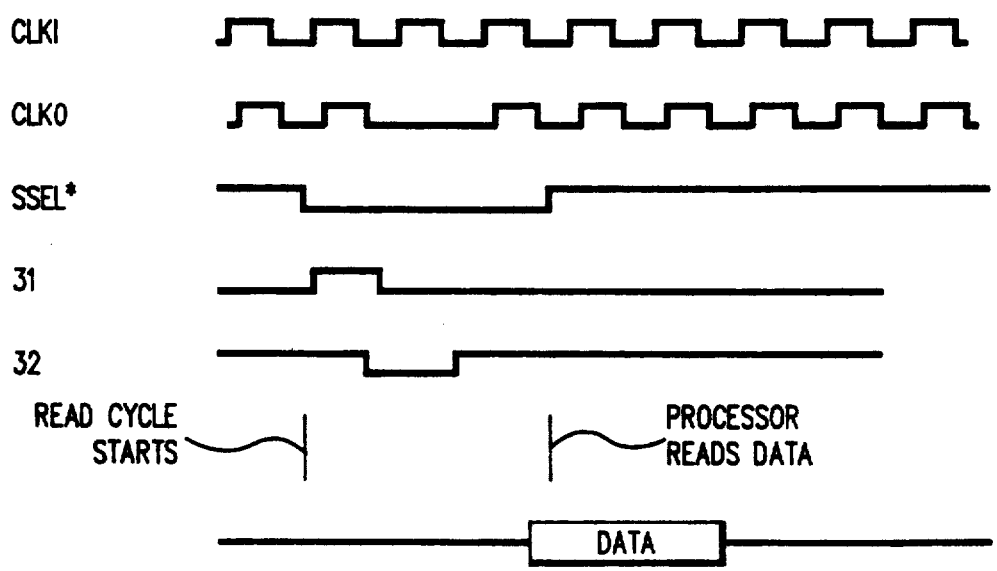
FIG. 4 shows clock waveforms for the microprocessor of FIG. 1 when "slow" memory is accessed.

Returning to FIG. 2, and with additional reference to the waveforms of FIG. 4, when a slow select signal SSEL* is received by the clock circuit 12, the output clock pulses are interrupted for a delay interval in order to give the slower access read only storage device 14 sufficient time to place stable data on the lines of data bus 18.

In order to do this, the transition low of the slow select signal clocks the flip-flop 24. Since the data input to the flip-flop 24 is tied to a logic high, its Q output on the line 31 goes high. The next falling edge of an input clock pulse on the line 22 clocks the flip-flop 26. At this time, the line 31 is high, and this is the data input to the flip-flop 26. Therefore, the Q-not output 32 of the flip-flop 26 goes to a logic low. Since the line 32 is one input to the AND gate 27, as long as it is at a logic low, the output of the AND gate 27 is also held low. That is, no clock pulses CLKO are sent to microprocessor 11.

The signal on the line 32 is coupled through a delay circuit 28 to the active low clear, or reset, terminal of the flip-flop 24. In the absence of any delay in the circuit 28, the Q output of the flip-flop 24 is immediately set to a logic low when the Q-not output of the flip-flop 26 goes low. On the subsequent falling edge of the input clock signal, the logic low on the line 31 is coupled to the Q output of the flip-flop 26 and its Q-not output goes to a logic high. This returns the line 32 input to the AND gate 27 to a logic high, and the output clock signal CLKO returns to following the state of the input clock signal CLKI.

From an examination of the waveforms of FIG. 4, it can be seen that a "read" cycle for the ROS 14 starts with the fall of the slow select signal, and the processor reads the ROS data when the slow select signal goes high. This is at a time after the data has been given time to settle on the data lines. To accommodate the slower response time of the ROS 14 compared to the RAM 13, one clock cycle has been deleted from the clock output signal CLKO. This suspends operation of the processor 11, allowing additional time for the data to settle on the data lines before it is read by the processor.

The delay circuit 28 can be set manually, for example by setting a switch, or by suitable signals from the microprocessor, to introduce additional clock cycles of delay before the flip-flop 24 is cleared. This has the result of removing two or more clock cycles from the output clock pulse train rather than just one.

Figure 5A:
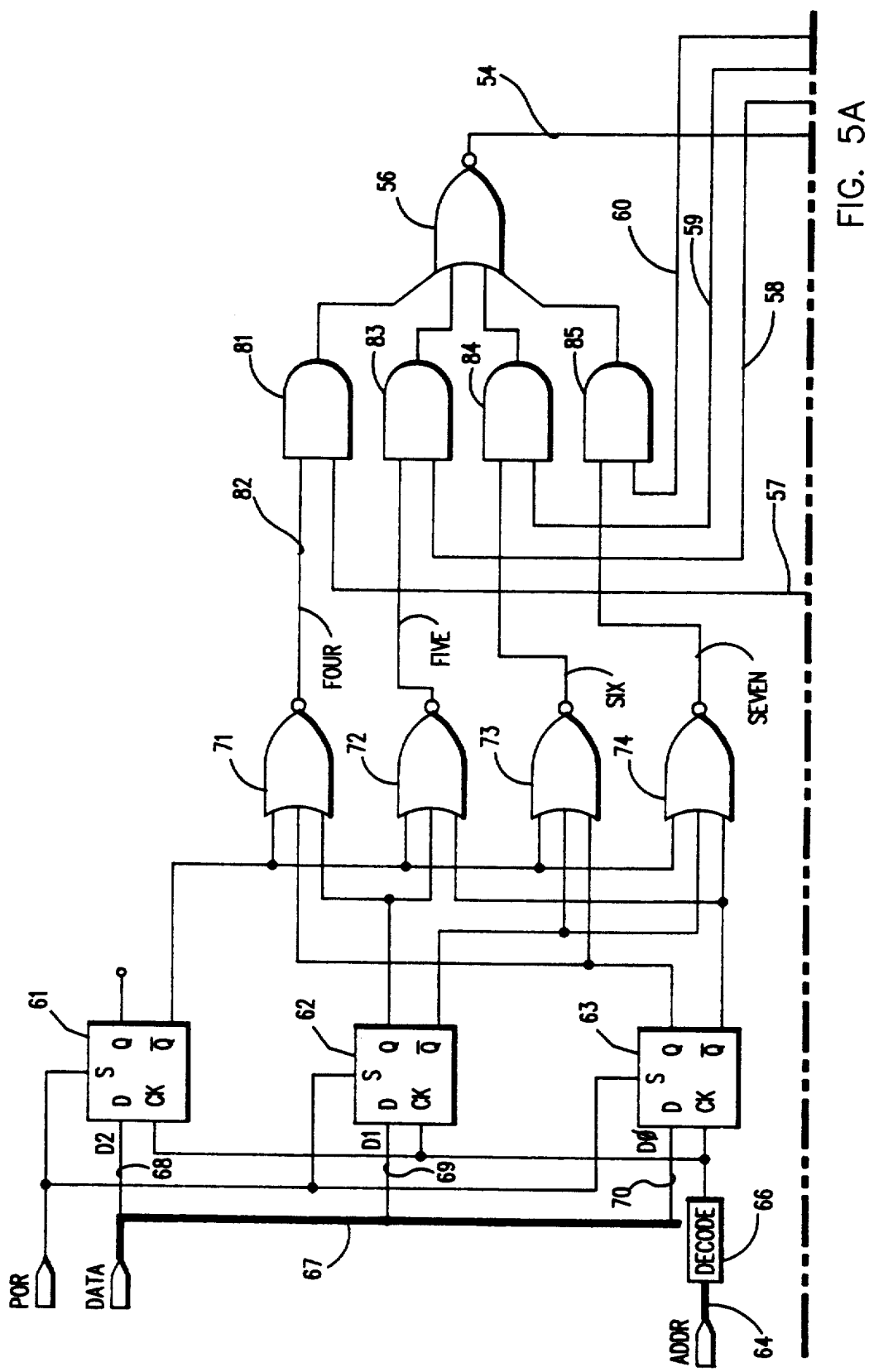
FIG. 5, shown in two parts as FIGS. 5A and 5B, is a detailed circuit diagram of an implementation of the clock circuit of FIG. 2.
Figure 5B:
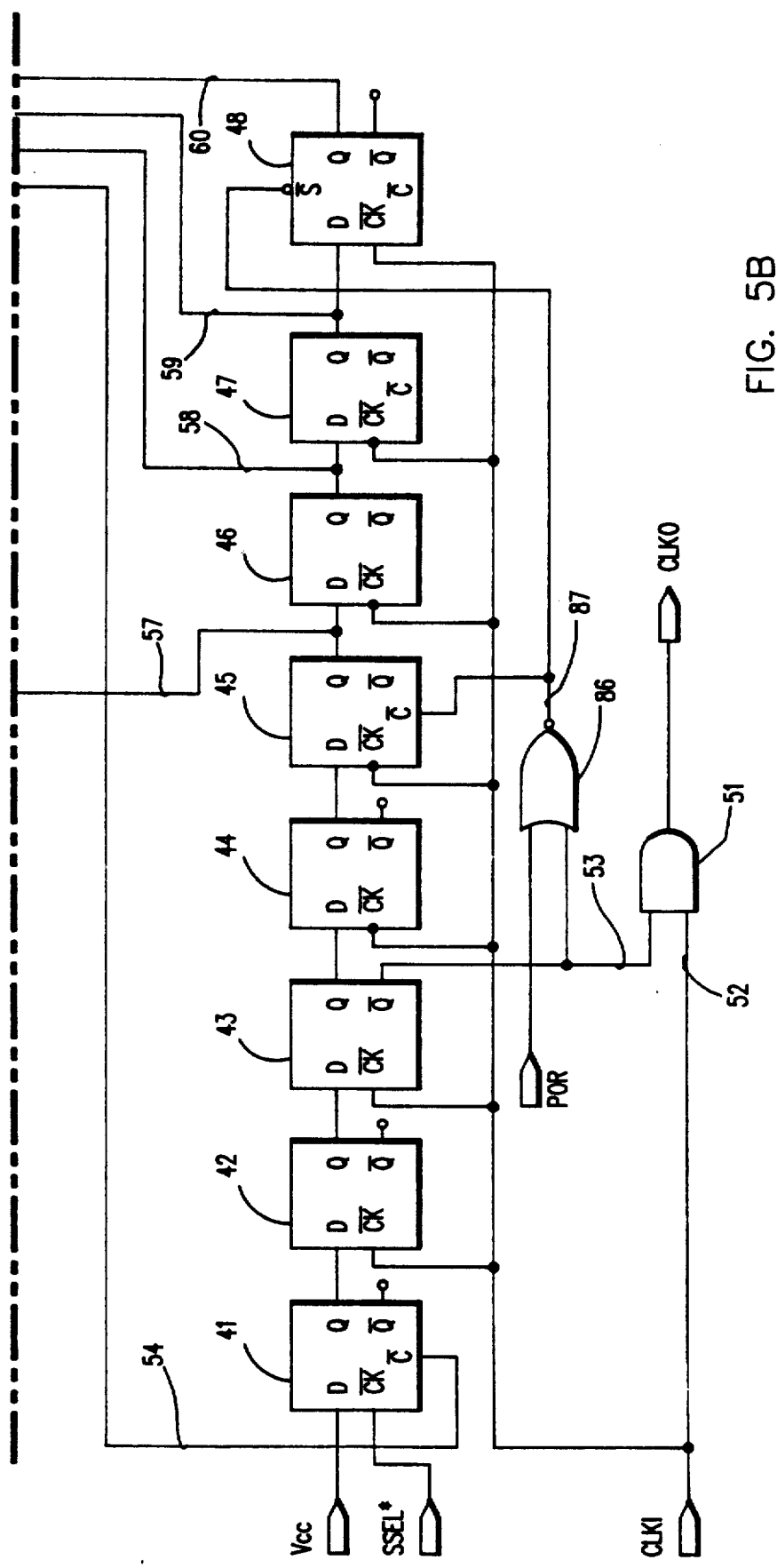

FIG. 5, in the form of FIGS. 5A and 5B, shows a particular implementation of the clock circuit of FIGS. 1 and 2. Generally, the circuitry in FIG. 5A serves as a programmable delay circuit, such as the circuit 28 of FIG. 2, when taken in conjunction with flip-flops 44, 45, 46, 47 and 48 of FIG. 5B. In FIG. 5B, the flip-flop 41 is generally equivalent in function to the flip-flop 24 of FIG. 2, and the flip-flops 42 and 43 of FIG. 5B are functionally equivalent to flip-flop 26 in FIG. 2.

In FIG. 5, the input clock signal CLKI is coupled to an AND gate 51 as one input 52 thereof. As long as the other input 53 to the AND gate 51 is at a logic high, the input clock pulses are coupled through the AND gate to form the output clock pulse signal CLKO. When the slow select signal SSEL* goes low, the logic high (VCC) at the data input of the flip-flop 41 is coupled to its Q output. This logic high is clocked to the Q output of the flip-flop 42 on the next falling edge of the input clock signal and then clocked to the Q output of the flip-flop 43 on the next falling edge of the input clock signal.

As the Q output of flip-flop 43 goes high, the Q-not output of the flip-flop 43 goes low, and hence the line 53 goes low. The line 53 is one of the inputs to the AND gate 51. This condition blocks further input clock pulses from passing the AND gate 51 to the clock output signal line. This condition will persist so long as the Q output of the flip-flop 41 stays at a logic high, keeping the Q outputs of the flip-flops 42 and 43 at a logic high and the Q-not output of the flip-flop 43 at a logic low.

As shall be discussed subsequently, the above-described condition of the logic low at the Q-not output of the flip-flop 43 will end when the flip-flop 41 is cleared by a logic low on the line 54. The line 54 is the output of a NOR gate 56 in the variable delay portion of the clock circuit. In the present instance, the possible delays (number of CLKI clock cycles blocked from CLKO) are 4, 5, 6 or 7 clock cycles.

After the SSEL* signal causes the Q output of the flip-flop 41 to go high, two clock pulses are permitted to pass the AND gate 51, due to the provision of flip-flops 42 and 43, prior to blocking the input clock pulses from reaching the clock output line. This is in order to permit the completion of processor operations at the beginning of the memory access cycle before the processor is "suspended" while the clock pulses are blocked. In the present instance, two clock pulses are provided to permit placing sequential address information on the address lines.

The logic high at the Q output of the flip-flop 43 is coupled to the Q outputs of the flip-flops 44, 45, 46, 47 and 48 on the falling edges of the five succeeding input clock pulses. The Q outputs of the flip-flops 45, 46, 47 and 48 sequentially go to a logic high state which is placed on the lines 57, 58, 59 and 60, respectively. How far the logic high propagates along the lines 57-60 determines the length of the delay before another clock pulse is permitted to pass through the AND gate 51 to the output clock line.

The desired number of clock cycles of delay is maintained in a register, formed by a series of flip-flops 61 and 62 and 63. When the microprocessor wishes to set a delay, it does this by placing the address of the register formed by the flip-flops 61-63 on an address bus 64, which address is decoded by decode circuitry 66, after the microprocessor has first placed the desired delay data on a data bus 67, which contains the data lines 68, 69 and 70. The address bus 64 and the data bus 67 correspond to the address and control lines 19 of FIG. 1. The address bus 64 includes a "write strobe" line. The data is clocked to the Q outputs of the flip-flops 61-63 by a signal on the "write strobe" line when the address is decoded.

These Q outputs, and the associated Q-not outputs, are decoded by NOR gates 71, 72, 73 and 74 to enable the reset of the flip-flop 41 after the desired number of input clock pulses. For example, if the output of the NOR gate 74 is at a logic high, the delay setting is for the omission of seven cycles from the output clock pulse sequence. The output of the NOR gate 74 is high when each of the Q outputs of the flip-flops 61-63 is at a logic high and the Q-not outputs of the flip-flops are at a logic low. Each of the Q-not outputs serves as an input to the NOR gate 74, resulting in its logic high output.

As shown, the least significant digit D0 of the input data lines is on the line 70, which is connected to the D input of the flip-flop 63. The next significant digit D1 is on the line 69, and the most significant digit D2 is on the line 68.

An AND gate 81 has as one input the output of the NOR gate 71 and as its other input the Q output of the flip-flop 45. If the flip-flops 61-63 have been set for a four pulse delay, the output of the NOR gate 71, which is the input 82 to the AND gate 81, is high. When the Q output of the flip-flop 45 goes high (two pulses after the output clock pulses have been stopped by AND gate 51), the output of the AND gate 81 goes high. This high output of the AND gate 81 is coupled to the NOR gate 56 producing a logic low on the line 54, which clears the flip-flop 41. It then takes two more clock pulses in the input clock pulse train to move the logic low, which is placed on the Q output of the flip-flop 41 by the "clear", to the output of the flip-flop 43. At this same time, the Q-not output of the flip-flop 43 goes high, again enabling pulses to pass the AND gate 51 to form the clock output signal.

The four input pulse delay is obtained by blocking pulses from the CLKO signal for two input pulses as the logic high on the Q output of the flip-flop 43 is clocked to the Q output of the flip-flop 44 and then the Q output of the flip-flop 45, and then for two more input pulses as the logic low on the Q output of the flip-flop 41 is clocked to the Q output of the flip-flop 42 and then to the Q output of the flip-flop 43. The NOR gate outputs for a 5, 6 or 7 pulse delay are similarly compared at the AND gates 83, 84 and 85 with the Q outputs of the flip-flops 46, 47 and 48, respectively, to determine the appropriate delay.

The logic low at the output of the flip-flop 41 (when it is cleared) propagates along the chain of flip-flops with succeeding input clock pulses. To insure that the later flip-flops are also cleared before a requirement for another delay, an input to a NOR gate 86 is coupled to the line 53, which goes high when the AND gate 51 is again enabled to pass clock pulses, causing a logic low transition of the output 87 of the gate 86 which clears the flip-flop 45. The logic low produced at the Q output of the flip-flop 45 is in turn sequenced along the chain of flip-flops to, in effect, clear the flip-flops 46 and 47. The output 87 of the inverter 86 is also connected to a set-not (S-not) input of the flip-flop 48. The Q output of the flip-flop 48 goes high (the flip-flop 48 is set) at the same time that the flip-flop 45 is reset. The logic low at the Q output of the flip-flop 45, occurring at reset, propagates to the Q output of the flip-flop 48 on the third clock pulse after reset.

A second input to the NOR gate 86 is from a "power on reset" (POR) signal which pulses high when the circuit is powered up. This logic high results in a logic low at the output 87 of the NOR gate 86, setting the flip-flop 48 as just described. At "power on" the logic high on the line 60 produced by setting the flip-flop 48 cooperates with a default setting of the flip-flops 61-63 to produce a logic high at the output of the AND gate 85. This logic high is coupled to the NOR gate 56, which resets the flip-flop 41. This resets the delay circuitry, as has been earlier described, when the circuit is powered up.

The default setting for the flip-flops 61-63 is such that each of their Q outputs is high. This setting establishes a seven pulse delay. The default setting is obtained by the "power on reset" signal, which sets each of the flip-flops 61-63.

We claim:

1. A microprocessor arrangement comprising:
a microprocessor;
a source of substantially constant frequency clock pulses;
a fast memory device accessible by the microprocessor, said fast memory device having an access time equal to or shorter than the access time provided by operation of said microprocessor at the clock rate of said source of substantially constant frequency pulses;
a slow memory device accessible by the microprocessor, said slow memory device having an access time longer than the access time provided by operation of said microprocessor at the clock rate of said source of substantially constant frequency clock pulses;
means for receiving a signal when the microprocessor is selecting the slow memory device for access; and
means for normally coupling the clock pulses from said source of substantially constant frequency clock pulses to the microprocessor for allowing accessing of fast memory devices, and for not coupling a number of the clock pulses to the microprocessor in response to the receipt of said signal by said means for receiving a signal for allowing accessing of slow memory, said means for normally coupling and not coupling clock pulses to the microprocessor including (a) a first flip-flop coupled to said signal for allowing accessing of slow memory, (b) a second flip-flop having an input coupled to an output of the first flip-flop and coupled at a clock input to the source of substantially constant frequency clock pulses, wherein the first flip-flop changes from a first state to a second state in response to said signal and the second flip-flop changes from a first state to a second state in response to the first flip-flop changing to the second state, (c) a gate having an input coupled to the source of substantially constant frequency clock pulses and having an output coupled to the microprocessor, the gate being responsive to the change of the second flip-flop to its second state to block a number of said clock pulses from reaching the microprocessor, and (d) delay means coupled to receive the output of said second flip flop and coupled to a reset terminal of the first flip flop, said delay means responsive to the change of said second flip flop to its second state and providing a reset signal to the first flip flop after a delay, said reset signal returning said first flip flop to the first state, the second flip flop being responsive to the change of the first flip flop to its first state to return to its first state, thereby ending the blocking of said clock pulses by said gate from reaching the microprocessor.

2. The microprocessor arrangement of claim 1 in which the first flip-flop is responsive to the change of the second flip-flop to its second state to return to its first state, and the second flip-flop is responsive to the change of the first flip-flop to its first state to return to its first state, whereby the gate stops blocking clock pulses from the microprocessor.

3. The microprocessor arrangement of claim 1 wherein said delay means is programmable by said microprocessor.

* * * * *